United States Patent
Kubota

(10) Patent No.: US 9,160,235 B2
(45) Date of Patent: Oct. 13, 2015

(54) POWER SUPPLY APPARATUS AND IMAGE FORMING APPARATUS

(71) Applicant: CANON KABUSHIKI KAISHA, Tokyo (JP)

(72) Inventor: Junichi Kubota, Higashiyamato (JP)

(73) Assignee: CANON KABUSHIKI KAISHA, Tokyo (JP)

(*) Notice: Subject to any disclaimer, the term of this patent is extended or adjusted under 35 U.S.C. 154(b) by 71 days.

(21) Appl. No.: 13/905,758

(22) Filed: May 30, 2013

(65) Prior Publication Data

US 2013/0329469 A1 Dec. 12, 2013

(30) Foreign Application Priority Data

Jun. 8, 2012 (JP) .................... 2012-130639

(51) Int. Cl.
*H02M 3/335* (2006.01)

(52) U.S. Cl.
CPC .................. *H02M 3/33507* (2013.01)

(58) Field of Classification Search
USPC .......................... 363/18, 19, 20.01
See application file for complete search history.

(56) References Cited

U.S. PATENT DOCUMENTS

| | | | | |
|---|---|---|---|---|
| 3,035,220 A * | 5/1962 | Fischer | | 363/18 |
| 3,851,589 A * | 12/1974 | Meyer | | 102/215 |
| 4,208,705 A * | 6/1980 | Hosoya | | 363/19 |
| 6,160,720 A | 12/2000 | Nishida et al. | | |
| 6,194,795 B1 * | 2/2001 | Muller | | 307/83 |
| 6,975,521 B1 * | 12/2005 | Konno | | 363/21.08 |
| 7,167,384 B2 * | 1/2007 | Yasumura | | 363/127 |
| 7,787,269 B2 * | 8/2010 | Murata | | 363/56.11 |
| 2002/0126516 A1 * | 9/2002 | Jeon | | 363/67 |
| 2003/0142521 A1 * | 7/2003 | Hosotani et al. | | 363/100 |
| 2007/0086218 A1 * | 4/2007 | Nakamura | | 363/21.01 |
| 2007/0086223 A1 * | 4/2007 | Uchida | | 363/52 |
| 2007/0139974 A1 * | 6/2007 | Aikawa et al. | | 363/16 |
| 2007/0171682 A1 * | 7/2007 | Yang et al. | | 363/20 |
| 2008/0049472 A1 * | 2/2008 | Nishida et al. | | 363/84 |
| 2008/0130327 A1 * | 6/2008 | Yan et al. | | 363/21.16 |
| 2008/0291702 A1 * | 11/2008 | Hosotani | | 363/21.02 |
| 2009/0147546 A1 * | 6/2009 | Grande et al. | | 363/21.16 |
| 2010/0104313 A1 * | 4/2010 | Kosaka et al. | | 399/88 |
| 2010/0315841 A1 * | 12/2010 | Saji | | 363/21.12 |
| 2011/0007537 A1 * | 1/2011 | Fornage | | 363/132 |
| 2011/0141775 A1 * | 6/2011 | Wang et al. | | 363/49 |
| 2012/0243268 A1 * | 9/2012 | Kern | | 363/21.12 |

FOREIGN PATENT DOCUMENTS

JP 2000278946 A 10/2000

* cited by examiner

*Primary Examiner* — Timothy J Dole
*Assistant Examiner* — Bryan R Perez
(74) *Attorney, Agent, or Firm* — Fitzpatrick, Cella, Harper & Scinto

(57) ABSTRACT

The power supply apparatus includes the feedback winding of a transformer having a first winding, and a second winding whose number of turns is larger than that of the first winding. A voltage output from the transformer is detected. Based on the detected voltage, connection between a switch element and the first winding or the second winding is switched.

12 Claims, 5 Drawing Sheets

POWER SUPPLY APPARATUS AND IMAGE FORMING APPARATUS

BACKGROUND OF THE INVENTION

1. Field of the Invention

The present invention relates to a power supply apparatus and an image forming apparatus and, more particularly, to improving the efficiency of a power supply apparatus of ringing choke converter (hereinafter referred to as RCC) system under light-load conditions.

2. Description of the Related Art

The recent increase in consciousness about environment and the like is producing a requirement to reduce power consumption of electronic devices. In general, for example, an electronic device such as a TV set or a printer is often in the standby state waiting for a user operation for a longer time than that in an actually operating state. For this reason, to reduce power consumption, it is important to improve the efficiency of the power supply apparatus in the standby state, that is, under light-load conditions.

On the other hand, a self-excited type power supply apparatus represented by the RCC type is simple and inexpensive and is therefore mounted in various electronic devices. As a means for improving the efficiency of the RCC type of the power supply apparatus (hereinafter referred to as RCC power supply) under light-load conditions, for example, in Japanese Patent Application Laid-Open No. 2000-278946, it is proposed, a method of lowering the output voltage and intermittently operating the RCC power supply apparatus in the standby state, thereby improving the efficiency.

However, when an output voltage V0 is lowered, and an FET 404 shown in FIG. 1 to be described later is turned on via a resistor 405, as in the related art, the loss of the FET 404 at turn-on increases. This will be described below with reference to FIG. 5.

FIG. 5 is a timing chart showing waveforms when the RCC power supply apparatus of the related art (for example, FIG. 1 to be described later) is operating in an intermittent oscillation state, and illustrates the waveforms of a drain-source voltage (Vds), a drain current (Id), and a gate-source voltage (Vgs) of the FET 404 from above. As shown in FIG. 5, in the intermittent operation state, the FET 404 cannot be turned on only by the voltage generated in a winding Nb. Hence, the FET 404 is turned on when the current flowing through the resistor 405 charges the gate-source capacitance. However, to reduce power consumption under light-load conditions, in general, the resistor 405 needs to have a high resistance, and the current flowing through the resistor 405 is very small. Hence, when turning on the FET 404 via the resistor 405, the turn-on of the FET 404 is largely delayed, and the loss at turn-on increases. Additionally, at turn-on of the FET 404, charges accumulated in a capacitor 414 are consumed as the loss of the FET 404. This loss increases in proportion to the square of Vds at turn-on of the FET 404. In the intermittent operation state, since Vds at turn-on of the FET 404 is almost equal to the potential of a capacitor 403 (illustrated as C 403 in FIG. 5), the loss further increases. Due to the above-described reasons, there is a limitation in improving the efficiency under light-load conditions only by lowering the output voltage V0 and operating the RCC power supply apparatus in the intermittent oscillation state.

When the number of turns of the winding Nb is increased so as to make the voltage generated in the winding Nb higher than the gate threshold voltage of the FET 404 even when lowering the output voltage V0, the voltage generated in the winding Nb when the output voltage V0 of normal level is output becomes high. This undesirably leads to a need to raise the breakdown voltages of circuit components, resulting in an increase in the cost. In addition, an operation error may occur and break the circuit.

SUMMARY OF THE INVENTION

In this context, the purpose of the present invention is to reduce the turn-on loss of a switch element under light-load conditions while preventing excessive voltage application to each element and an operation error of the circuit in a power supply apparatus that lowers the output voltage under light-load conditions.

Another purpose of the invention is to provide a power supply apparatus including a transformer including a primary winding, a secondary winding, and a feedback winding, the feedback winding including a first winding and a second winding whose number of turns is larger than a number of turns of the first winding, a switch element connected to the primary winding in series and turns on/off a power supply line to the transformer by a voltage applied to a control terminal, the switch element continuously turned on/off when the transformer outputs a predetermined voltage and intermittently turned on/off when a voltage lower than the predetermined voltage is output, a detection unit that detects the voltage output from the transformer, and a switching unit that switches to connect the first winding to the control terminal of the switch element when the voltage detected by the detection unit is at least the predetermined voltage and connect the second winding to the control terminal when the voltage detected by the detection unit is the voltage lower than the predetermined voltage.

A further purpose of the invention is to provide a power supply apparatus including a transformer including a primary winding, a secondary winding, and a feedback winding, the feedback winding including a center tap portion, a switch element that is connected in series with the primary winding and turns on/off power supply to the transformer by a voltage applied to a control terminal, the switch element continuously turned on/off when the transformer outputs a predetermined voltage, and intermittently turned on/off when a voltage lower than the predetermined voltage is output, and a detection unit that detects the voltage output from the transformer, and a switching unit that switches to connect the center tap portion to the control terminal of the switch element when the voltage detected by the detection unit is at least the predetermined voltage and connect a terminal of the feedback winding to the control terminal when the voltage detected by the detection unit is lower than the predetermined voltage.

A further purpose of the invention is to provide an image forming apparatus including a control unit that controls an operation of the image forming apparatus, and a power supply that supplies power to the control unit, the power supply including a transformer including a primary winding, a secondary winding, and a feedback winding, the feedback winding including a first winding and a second winding whose number of turns is larger than a number of turns of the first winding, a switch element that is connected in series with the primary winding and turns on/off a power supply line to the transformer by a voltage applied to a control terminal, the switch element continuously turned on/off when the transformer outputs a predetermined voltage, and intermittently turned on/off when a voltage lower than the predetermined voltage is output, a detection unit that detects the voltage output from the transformer, and a switching unit that switches to connect the first winding to the control terminal of the switch element when the voltage detected by the detection unit is the predetermined voltage and connect the second winding to the control terminal when the voltage detected by the detection unit is the voltage lower than the predetermined voltage.

A still further purpose of the invention is to provide an image forming apparatus including a control unit that controls an operation of the image forming apparatus, and a power supply that supplies power to the control unit, the power supply including a transformer including a primary winding, a secondary winding, and a feedback winding, the feedback winding including a center tap portion, a switch element that is connected in series with the primary winding and turns on/off power supply to the transformer by a voltage applied to a control terminal, the switch element continuously turned on/off when the transformer outputs a predetermined voltage, and intermittently turned on/off when a voltage lower than the predetermined voltage is output, and a detection unit that detects the voltage output from the transformer, and a switching unit that switches to connect the center tap portion to the control terminal of the switch element when the voltage detected by the detection unit is at least the predetermined voltage and connect a terminal of the feedback winding to the control terminal when the voltage detected by the detection unit is the voltage lower than the predetermined voltage.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

The conventional type of an RCC power supply will be described for the sake of comparison before an explanation of the RCC power supply according to this embodiment.

[Operation of Conventional RCC Power Supply Apparatus]

Figure 1:
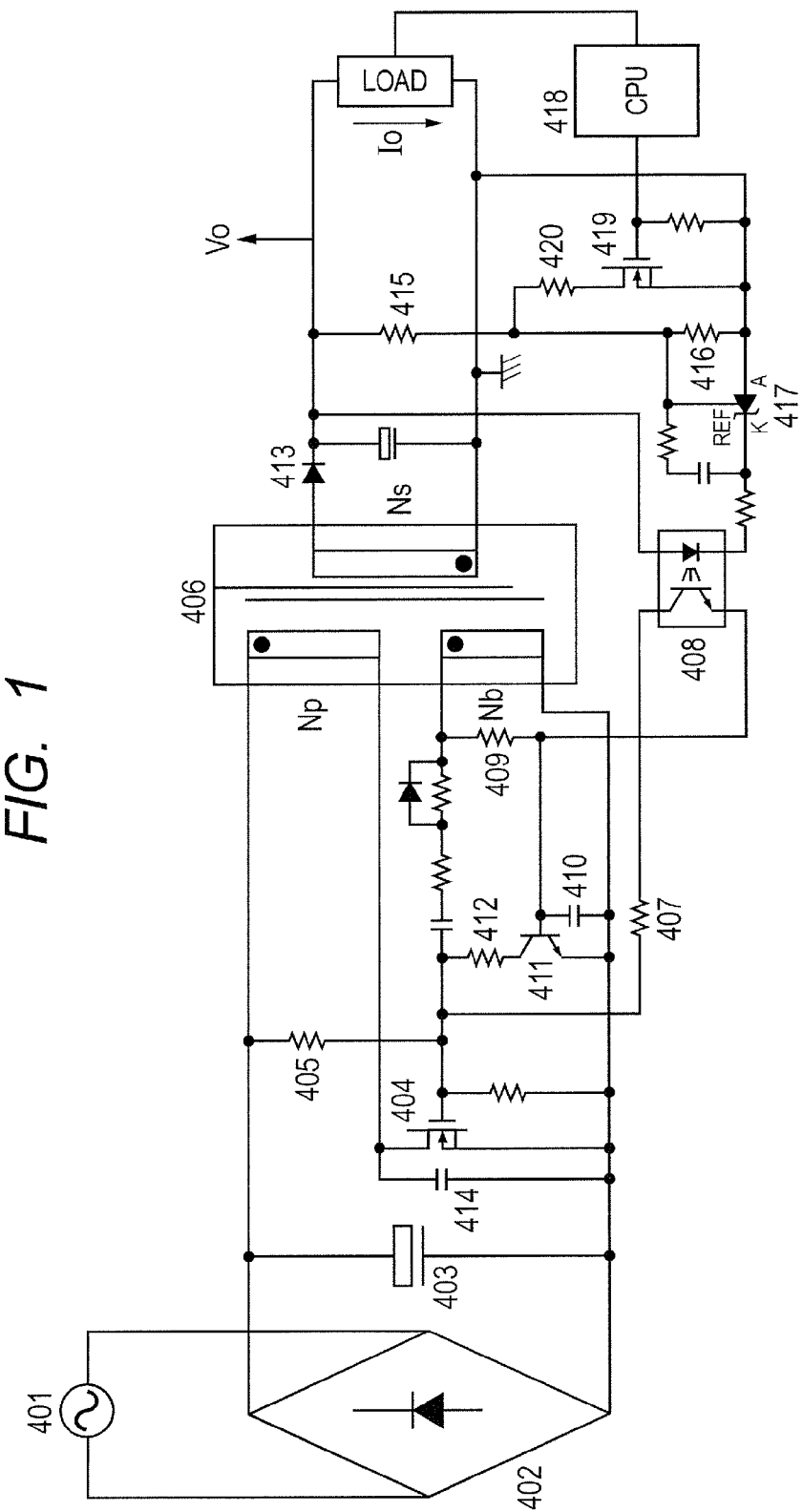
FIG. 1 is a circuit diagram of a conventional RCC power supply apparatus for the sake of comparison according to the first embodiment.

The operation of the conventional RCC power supply apparatus for the sake of comparison to the RCC power supply apparatus of this embodiment will be described with reference to FIG. 1. FIG. 1 is a circuit diagram showing an example of the conventional RCC power supply apparatus. A commercial power supply 401 is rectified by a bridge diode 402 and a smoothing capacitor 403 and converted into a DC voltage. Immediately after the commercial power supply 401 is turned on, a switching FET (hereinafter simply referred to as FET) 404 that is a switch element connected with a winding Np in series is in the turn-off state. However, the gate-source capacitance of the FET 404 is charged by the DC voltage via a resistor 405. When the gate-source voltage of the FET 404 exceeds a threshold voltage, the FET 404 changes to the on state.

When the FET 404 is turned on, a voltage is applied to the winding Np of a transformer 406. Each of a feedback winding (hereinafter simply referred to as a winding) Nb having the same polarity as the winding Np and a winding Ns having a polarity opposite to the winding Np also thus generates a voltage corresponding to the turn ratio and the polarity. The transformer 406 includes the winding Np serving as a primary winding, the winding Ns serving as a secondary winding, and the winding Nb serving as a feedback winding, and insulates the primary side and the secondary side from each other.

During the on state of the FET 404, a capacitor 410 is charged by a current flowing through a resistor 407 and the transistor of a photocoupler 408 and a current flowing from the winding Nb through a resistor 409. When the voltage of the capacitor 410 exceeds the base-emitter voltage of a transistor 411 in the turn-on state, and the transistor 411 is turned on, the gate-source voltage of the FET 404 has a value obtained by dividing the DC voltage by the resistor 405 and a resistor 412. Since the resistance value of the resistor 412 is set to be much smaller than that of the resistor 405, the FET 404 is turned off. Note that during the turn-on state of the FET 404, since the winding Ns generates a voltage that applies a reverse bias to a secondary-side diode 413, no current flows to the secondary-side winding Ns.

On the other hand, when the FET 404 is turned off, the voltage of the winding Ns is inverted. Hence, the diode 413 is turned on, and the energy accumulated in the transformer 406 during the turn-on state of the FET 404 is released to secondary side. During the time the transformer 406 is releasing the energy to the secondary side, the winding Nb generates a voltage that applies a reverse bias between the gate and source of the FET 404. Hence, the FET 404 is never turned on. When the energy release by the transformer 406 ends, the voltage of the winding Ns vibrates at a frequency determined by the inductance value of the winding Np and the capacitance of a capacitor 414. At this time, the amplitude of the vibration is determined by an output voltage V0.

Since the winding Nb also generates a voltage proportional to the turn ratio Nb/Ns of the windings Ns and Nb, the voltage generated by the winding Nb also vibrates. At this time, the voltage generated by the winding Nb charges the gate-source capacitance of the FET 404. When the gate voltage of the FET 404 rises to the threshold voltage again, the FET 404 changes to the turn-on state again. The above-described operation is repeated, thereby supplying power to the secondary side via the transformer 406. As described above, after the energy accumulated in the transformer 406 is released on the secondary side, the voltage generated by the winding Nb is applied to the gate terminal serving as the control terminal of the FET 404 to turn on the FET 404. The FET 404 thus continuously repeats on/off. Note that the operation state in which the FET 404 is continuously turned on/off will be referred to as a continuous oscillation state hereinafter.

Constant voltage control will be described below. The output voltage V0 on the secondary side is normally divided by resistors 415 and 416 and input to the REF terminal of a shunt regulator 417. When the load lightens, and the power is supplied beyond the power consumption on the secondary side, the output voltage V0 rises. At this time, the voltage of the cathode terminal (K) of the shunt regulator 417 lowers. A current (hereinafter simply referred to as If) flowing through the light-emitting diode of the photocoupler 408 thus increases. For this reason, a collector current (hereinafter simply referred to as Ic) of the photocoupler 408 increases, the charging time of the capacitor 410 shortens, and the on time of the FET 404 shortens. When the on time of the FET 404 shortens, the energy accumulated in the transformer 406 decreases. Hence, the power supply amount decreases, and the voltage is kept constant. On the other hand, when the load becomes heavy, and the power supply amount runs short of the power consumption on the secondary side, the output voltage V0 lowers. At this time, the voltage of the cathode terminal of the shunt regulator 417 rises. Since the current If decreases, the collector current Ic decreases, and the charging time of the capacitor 410 prolongs so that the power supply amount increases. For this reason, the voltage is kept constant, and a predetermined voltage can be output. As described above, in the RCC power supply apparatus shown in FIG. 1, the charging time of the capacitor 410, that is, the switching period of the FET 404 is changed, thereby maintaining a constant output voltage.

The operation of the RCC power supply apparatus when the output voltage V0 is lowered will be described below. Referring to FIG. 1, when the load of the RCC power supply apparatus lightens, a CPU 418 outputs a high-level signal from its control terminal to turn on an FET 419. Since the resistance value of a resistor 420 is set to be smaller than that of the resistor 415, the output voltage V0 lowers. In the state in which the output voltage V0 is low, after the energy accumulated in the transformer 406 is released on the secondary side, the amplitude of voltage vibration that occurs in the winding Nb becomes small. At this time, when the generated voltage drops below the gate threshold voltage of the FET 404, the FET 404 cannot be turned on by the voltage generated by the winding Nb and therefore cannot maintain the continuous oscillation state. Hence, the FET 404 cannot be turned on until the gate-source capacitance is charged via the resistor 405 again, and the gate voltage reaches the threshold voltage.

When the output voltage V0 lowers, the RCC power supply apparatus performs the above-described operation. Hence, the oscillation period of the FET 404 becomes long. In the RCC power supply apparatus, most of the circuit loss under light-load conditions is the switching loss of the FET 404. Hence, the number of times of switching of the FET 404 is decreased, thereby reducing the circuit loss and implementing efficiency improvement. As described above, after the energy accumulated in the transformer 406 is released on the secondary side, the FET 404 cannot be turned on by the voltage generated by the winding Nb. Hence, the FET 404 is turned on via the resistor 405. Note that the operation of intermittently turning on/off the FET 404 when the output voltage V0 is low will be referred to as an intermittent oscillation state hereinafter.

As described above, in the conventional RCC power supply apparatus that improves the efficiency by lowering the output voltage and lowering the oscillation frequency under light-load conditions, the FET 404 serving as the main switch element cannot be turned on by the vibration voltage generated by the winding Nb serving as the feedback winding under light-load conditions. Since turning on the FET 404 relies on the charging current from the resistor 405 serving as the starting resistor, the turn-on is delayed, and the turn-on loss increases. In addition, when the number of turns of the winding Nb is increased to turn on the FET 404 even in the output voltage V0 under light-load conditions, it is feared that the voltage applied to each element will increase in the normal operation, or an operation error will occur in the circuit.

[Operation of RCC Power Supply Apparatus of this Embodiment]

Figure 2:
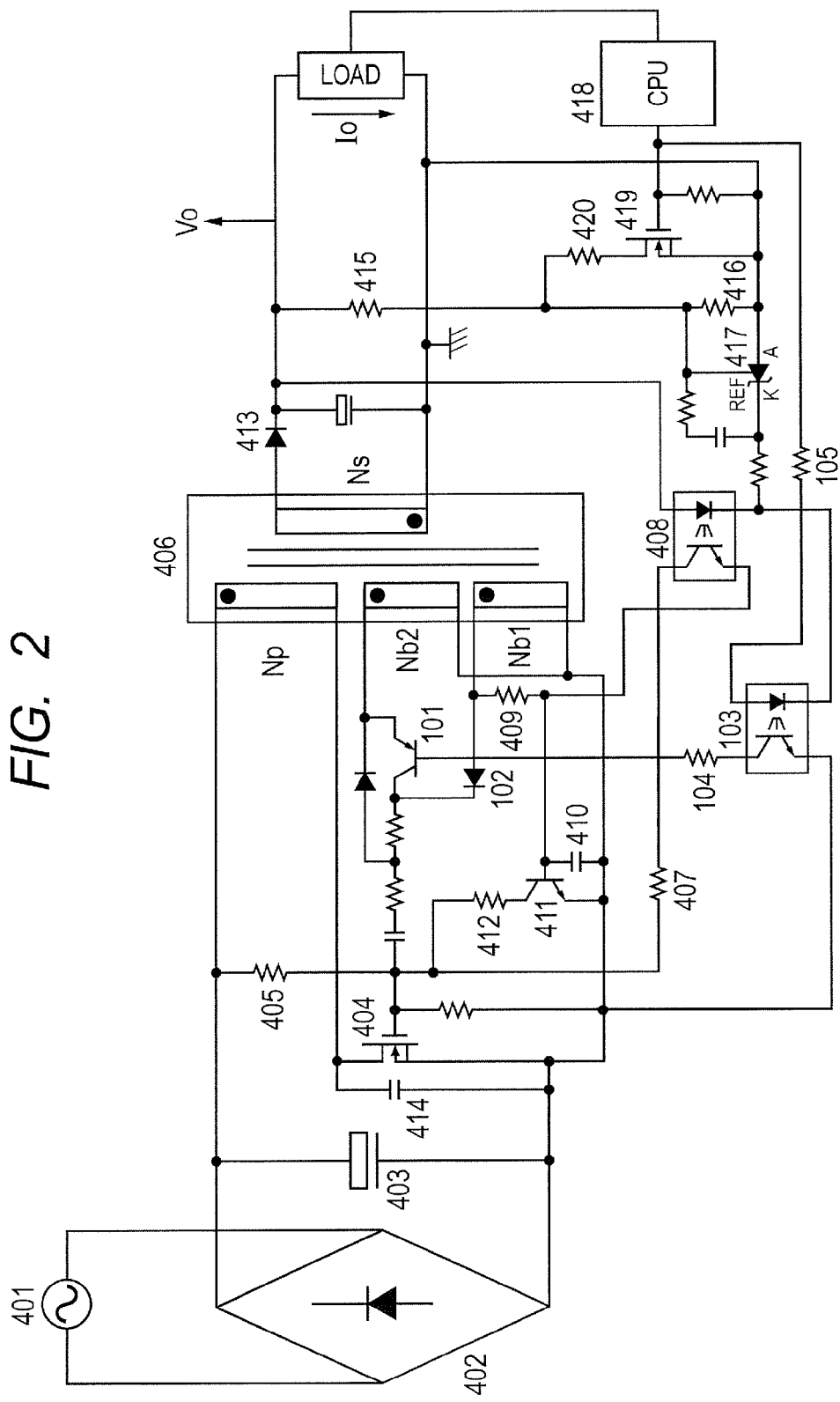
FIG. 2 is a circuit diagram of an RCC power supply apparatus according to the first embodiment.

FIG. 2 is a circuit diagram showing an example of an RCC power supply apparatus according to the first embodiment. The same reference numerals as in the related art described with reference to FIG. 1 denote parts having the same functions. Note that an aforementioned description regarding the same operation will be omitted in the following description. The RCC power supply apparatus of this embodiment is different from the related art in that a transistor 101, a diode 102, a photocoupler 103, resistors 104 and 105, and an auxiliary winding Nb2 are added. Note that the number of turns of a winding Nb1 (first winding) shown in FIG. 2 is equal to that of the winding Nb shown in FIG. 1, and the number of turns of the winding Nb2 (second winding) is larger than that of the winding Nb1 (The number of turns of winding Nb2>number of the turns of winding Nb1). The operation of this embodiment will be described below in detail.

(Operation Under Light-Load Conditions)

A state in which the load of the RCC power supply apparatus is light, and an output voltage V0 is low will be described first. When the release of energy accumulated in a transformer 406 to the secondary side ends, the voltage of each winding starts vibrating.

At this time, to lower the output voltage V0, the control terminal of a CPU 418 is at high level, a current flows to the light-emitting diode of the photocoupler 103 via the resistor 105, and a collector current flows to the transistor of the photocoupler 103. When the collector current flows to the photocoupler 103, the transistor 101 is turned on via the resistor 104. Hence, the voltage generated by the winding Nb2 is applied to the gate of an FET 404. Since the number of turns of the winding Nb2 is larger than that of the winding Nb1, the voltage generated by the winding Nb2 is higher than that generated by the winding Nb1, and the diode 102 cannot be rendered conductive. That is, in the state (mode) in which the output voltage V0 is low, the feedback winding Nb2 is selected, and the voltage is applied to the gate of the FET 404. Since the voltage generated by the winding Nb2 is higher than that generated by the winding Nb1, the FET 404 can be turned on by the voltage generated by the feedback winding Nb2, unlike the related art.

Figure 3A:
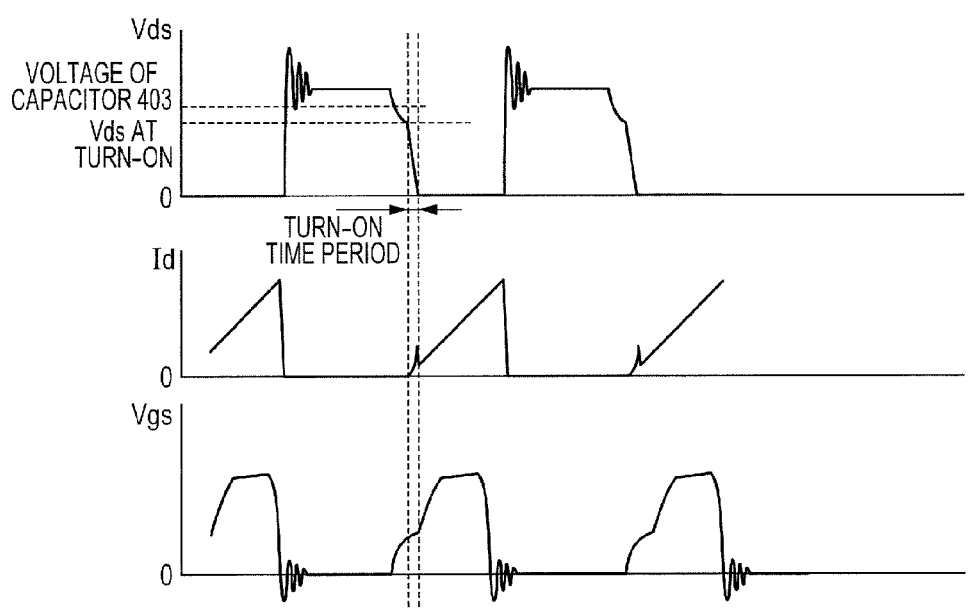
FIG. 3A is a timing chart showing the operation waveforms of a switch element of the RCC power supply apparatus according to the first embodiment.

FIG. 3A is a timing chart showing waveforms when the RCC power supply apparatus of this embodiment is operating in an intermittent oscillation state, and illustrates the waveforms of a drain-source voltage (Vds), a drain current (Id), and a gate-source voltage (Vgs) of the FET 404 from above. In this embodiment, as shown in FIG. 3A, even in the state in which the output voltage V0 is low, the turn-on of the FET 404 is never delayed, and the switching loss can be reduced. Additionally, as shown in FIG. 3A, the FET 404 can be turned on in a state in which the voltage of a winding Np is vibrating. For this reason, Vds when the FET 404 is turned on (Vds at turn-on) is lower than the voltage held in a smoothing capacitor 403. Since the amount of charges accumulated in a capacitor 414 is also small, the turn-on loss can further be reduced.

(Operation in Normal Operation State)

On the other hand, in the normal operation state in which the output voltage V0 is not low, the CPU 418 does not output the high-level signal, and the transistor 101 changes to the turn-off state. Hence, the winding Nb1 whose number of turns is smaller than that of the winding Nb2 and equal to that of the conventional winding Nb is selected. Hence, in the state in which the output voltage V0 is not low, the same operation as that of the conventional RCC power supply apparatus is performed, allowing to prevent excessive voltage application to each element and an operation error of the circuit. That is, in this embodiment, the photocoupler 103 determines turn-on/off of the transistor 101. When the transistor 101 is on, the winding is switched to the winding Nb2. When the transistor 101 is off, the winding is switched to the winding Nb1. In this embodiment, the transistor 101, the diode 102, and the photocoupler 103 form a switching unit (switch). In this embodiment, the CPU 418 (detector) detects the output voltage V0.

As described above, in this embodiment, the RCC power supply apparatus that lowers the output voltage under light-load conditions is configured to switch the auxiliary winding to be used in accordance with the output voltage. According to this embodiment, in the power supply apparatus that lowers the output voltage under light-load conditions, it is possible to reduce the turn-on loss of the switch element under light-load conditions while preventing excessive voltage application to each element and an operation error of the circuit.

Second Embodiment

[Operation of RCC Power Supply Apparatus of this Embodiment]

Figure 3B:
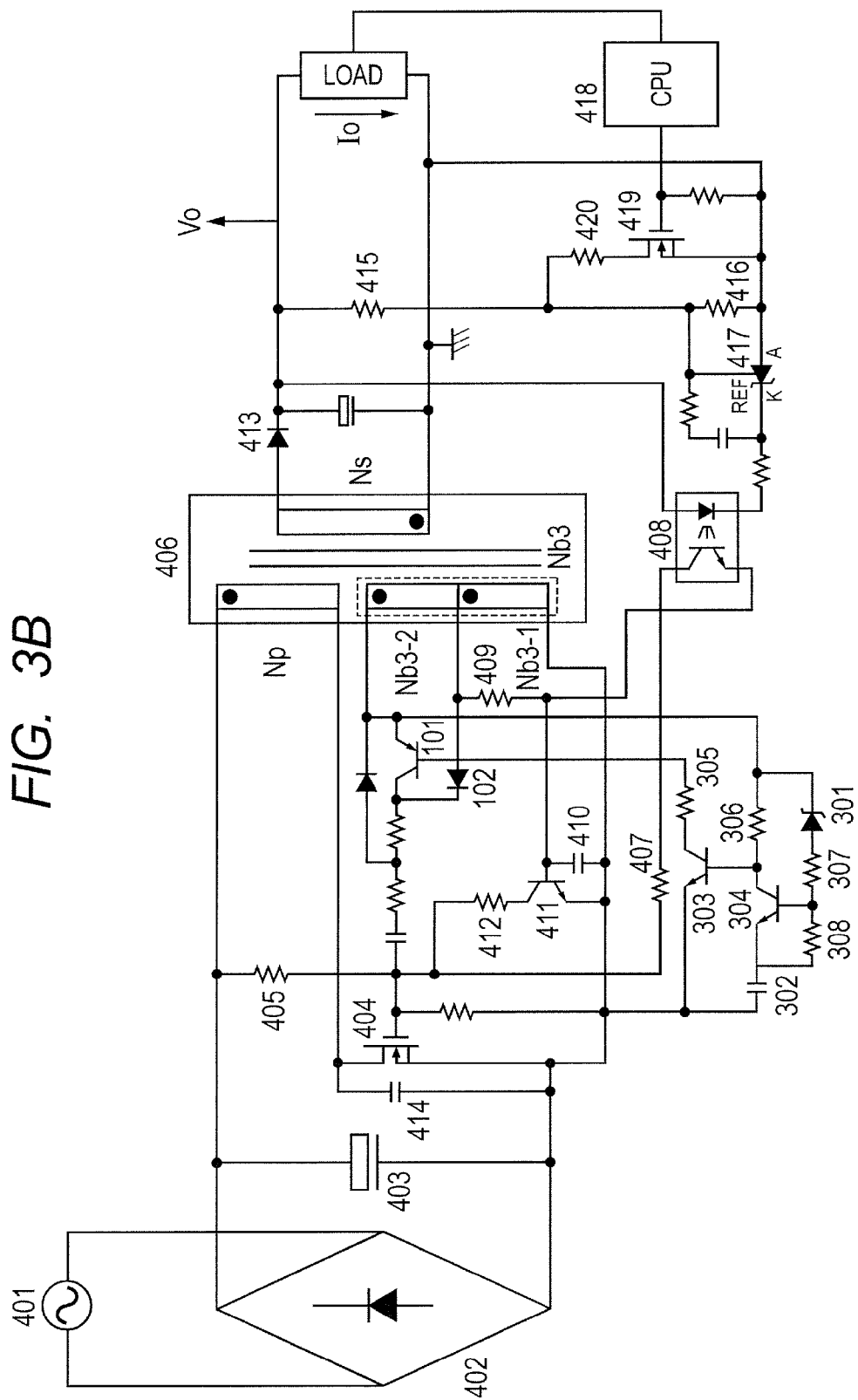
FIG. 3B is a circuit diagram of an RCC power supply apparatus according to the second embodiment.

FIG. 3B is a circuit diagram showing an example of an RCC power supply apparatus according to the second embodiment. The same reference numerals as in the first embodiment denote parts having the same functions. Note that a description of the same operation as in the first embodiment will not be repeated. This RCC power supply apparatus is different from that of the first embodiment in a Zener diode 301, a capacitor 302, transistors 303 and 304, resistors 305 to 308, and a feedback winding Nb3 provided with a center tap. Note that the number of turns of the feedback winding Nb3 equals that of the feedback winding Nb2 of the first embodiment, and the number of turns of a winding Nb3-1 of the center tap portion equals that of the winding Nb1 of the first embodiment. The operation of this embodiment will be described below in detail.

(Operation Under Light-Load Conditions)

A state in which the load of the RCC power supply apparatus is light, and an output voltage V0 is low will be described first. When the release of energy accumulated in a transformer 406 to the secondary side ends, the voltage of each winding starts vibrating. At this time, during the energy release from the transformer 406 to the secondary side, the capacitor 302 accumulates charges of a potential $V_{302}$ approximately given by the following equation.

$$V_{302} = Vol \times \frac{Nb3}{Ns} - Vf_{301}$$

In this equation, Vol and $Vf_{301}$ are the output voltage V0 and the forward voltage of the Zener diode 301 under light-load conditions, respectively, Ns is the number of turns of a winding Ns, and Nb3 is the number of turns of the winding Nb3. A Zener voltage $Vz_{3n}$ of the Zener diode 301 is set to satisfy the following formula.

$$Vz_{302} > Vol \times \frac{Nb3}{Ns} + V_{302} = 2 \times Vol \times \frac{Nb3}{Ns} - Vf_{301}$$

For this reason, during vibration of the voltage of each winding, the Zener diode 301 is always in the turn-off state. When the Zener diode 301 is in the turn-off state, the transistor 304 is off, and the transistors 101 and 303 are on. The voltage generated across the feedback winding Nb3 is applied to the gate terminal serving as the control terminal of an FET 404. Since the number of turns of the feedback winding Nb3 equals that of the winding Nb2 of the first embodiment, the FET 404 can be turned on. The RCC power supply apparatus of this embodiment can also sufficiently reduce the turn-on loss of the FET 404 even in the state in which the output voltage V0 is low, as in the first embodiment.

(Operation in Normal Operation State)

On the other hand, an operation when the output voltage V0 is not low will be described. When the output voltage V0 is not low, the capacitor 302 accumulates charges of the potential $V_{302}$ given by the following equation.

$$V_{302} = Voh \times \frac{Nb3}{Ns} - Vf_{301}$$

In this equation, Voh is the output voltage V0 in the normal operation state (note that Voh>Vol). The Zener voltage $Vz_{301}$ of the Zener diode 301 is set to satisfy the following formula.

$$Vol \times \frac{Nb3}{Ns} + V_{302} = 2 \times Vol \times \frac{Nb3}{Ns} - Vf_{301} < Vz_{301} < Voh \times \frac{Nb3}{Ns} + V_{302} = 2 \times Voh \times \frac{Nb3}{Ns} - Vf_{301}$$

When the output voltage V0 is not low, the Zener diode 301 is rendered conductive. Hence, the transistor 304 is turned on, and the transistors 101 and 303 are turned off. The voltage generated across the winding Nb3-1 is applied to the gate terminal of the FET 404 via the center tap. Since the number of turns of the winding Nb3-1 is equal to that of the winding Nb1 of the first embodiment and smaller than that of the winding Nb3, it is possible to prevent excessive voltage application to each element and an operation error of the circuit. That is, in this embodiment, the transistors 303 and 304 determine turn-on/off of the transistor 101. When the transistor 101 is on, the winding is switched to the winding Nb3 (Nb3-1+Nb3-2). When the transistor 101 is off, the winding is switched to the winding Nb3-1. In this embodiment, the transistor 101, a diode 102, and the transistors 303 and 304 form a switching unit (switch). In this embodiment, the Zener diode 301 (detector) and the capacitor 302 (detector) detect the output voltage V0.

As described above, in this embodiment, it is possible to detect the decrease in the output voltage V0 on the primary side of the transformer 406 and switch the feedback winding to be selected. For this reason, as compared to the first embodiment, it is unnecessary to use an expensive insulating element such as the photocoupler 103 to ensure the distance between the primary side and the secondary side of the circuit. In addition, in this embodiment, since the center tap is used, the number of turns of the winding Nb3 (the sum of the number of turns of the winding Nb3-1 and that of the winding Nb3-2) equals that of the winding Nb2 of the first embodiment, and the total number of turns of the feedback winding can also be reduced. This allows reduction of the cost of the power supply apparatus. According to this embodiment, in the power supply apparatus that lowers the output voltage under light-load conditions, it is possible to reduce the turn-on loss of the switch element under light-load conditions while preventing excessive voltage application to each element and an operation error of the circuit.

Third Embodiment

The RCC power supply apparatus described in the first or second embodiment is applicable as, for example, a low-voltage power supply of an image forming apparatus, that is a power supply that supplies power to a controller (control unit) or a driving unit such as a motor. The arrangement of the image forming apparatus to which the RCC power supply apparatus of the first or second embodiment is applied will be described below.

[Arrangement of Image Forming Apparatus]

Figure 4:
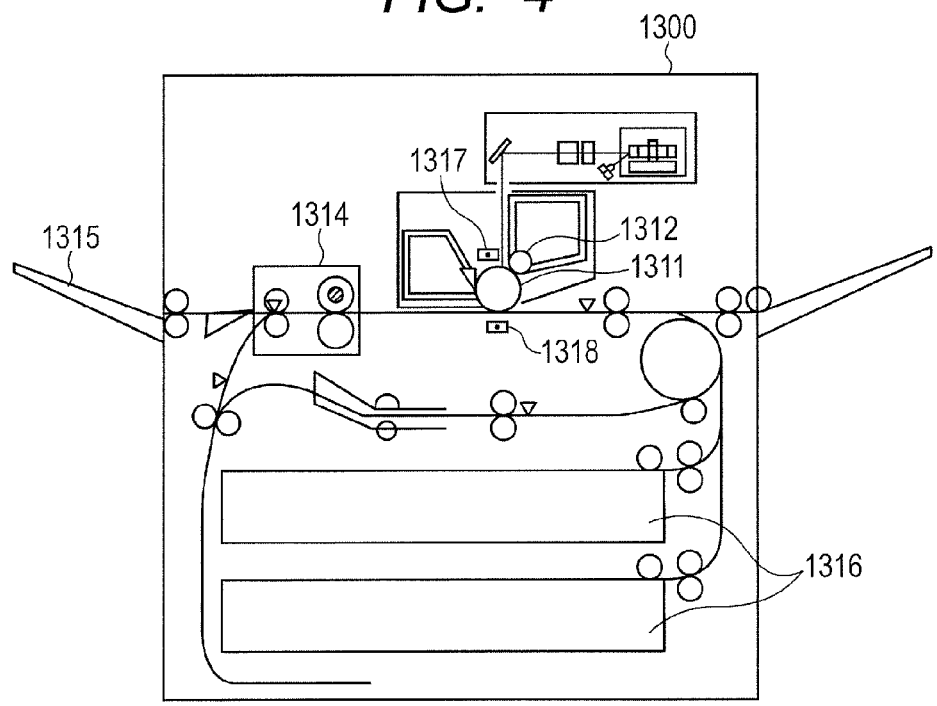
FIG. 4 is a view showing the arrangement of an image forming apparatus according to the third embodiment.
Figure 5:
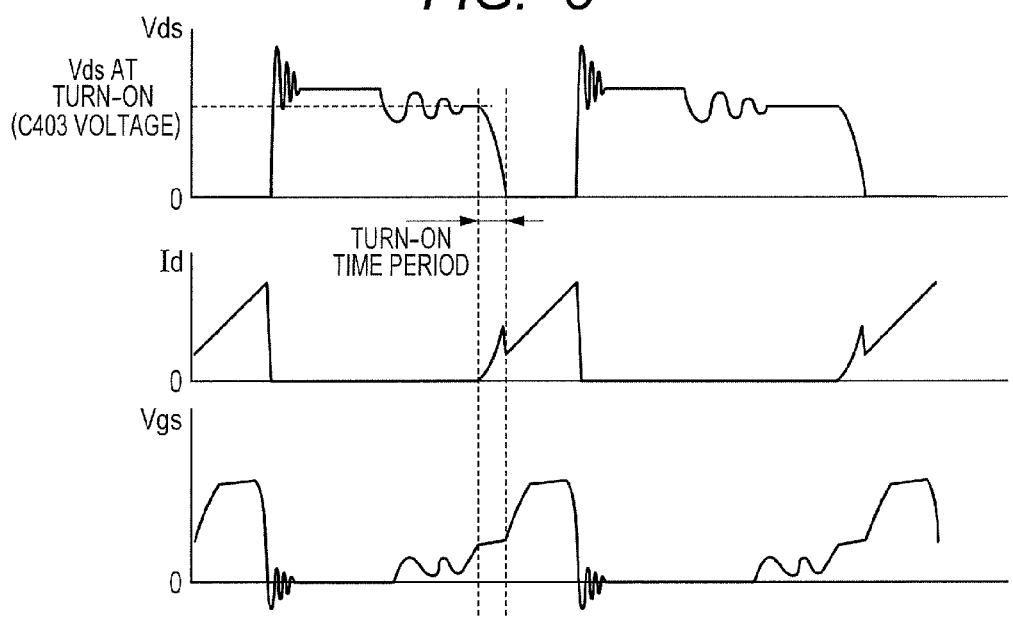
FIG. 5 is a timing chart showing the operation waveforms of a switch element of an RCC power supply apparatus according to a related art.

A laser beam printer will be exemplified as the image forming apparatus. FIG. 4 shows the schematic arrangement of a laser beam printer that is an example of an electrophotographic printer. A laser beam printer 1300 includes a photosensitive drum 1311 serving as an image carrier on which an electrostatic latent image is formed, and a charging device 1317 (charging unit) that uniformly charges the photosensitive drum 1311. The laser beam printer 1300 also includes a developing device 1312 (developing unit) that develops the electrostatic latent image formed on the photosensitive drum 1311 by toner. A transfer device 1318 (transfer unit) transfers the toner image developed on the photosensitive drum 1311 to a sheet (not shown) serving as a printing material supplied from a cassette 1316. The toner image transferred to the sheet is fixed by a fixing device 1314 and discharged to a tray 1315. The photosensitive drum 1311, the charging device 1317, the developing device 1312, and the transfer device 1318 form an image forming unit. The laser beam printer 1300 includes an RCC power supply apparatus (not shown in FIG. 4) described in the first or second embodiment. Note that the image forming apparatus using the RCC power supply apparatus of the first or second embodiment is not limited to that exemplified in FIG. 4 and may be, for example, an image forming apparatus including a plurality of image forming units. Alternatively, the image forming apparatus may include a primary transfer device that transfers the toner image on the photosensitive drum 1311 to an intermediate transfer belt, and a secondary transfer device that transfers the toner image on the intermediate transfer belt to a sheet.

The laser beam printer 1300 includes a controller (not shown) that controls the image forming operation of the image forming unit or a sheet conveyance operation. The RCC power supply apparatus described in the first or second embodiment supplies power to, for example, the controller. The RCC power supply apparatus described in the first or second embodiment also supplies power to a driving unit such as motor to rotate the photosensitive drum 1311 or drive various kinds of rollers for conveying a sheet. That is, the load (see FIGS. 1 to 3) of the first and second embodiments corresponds to the controller or the driving unit. In the standby state to implement power saving (for example, under light-load conditions in the power saving mode or standby mode), the image forming apparatus of this embodiment can reduce the power consumption by lightening the load, for example, supplying power only to the controller. That is, in the image forming apparatus of this embodiment, the RCC power supply apparatus described in the first or second embodiment changes to the intermittent oscillation state by lowering the output voltage V0 in the power saving mode. When the image forming apparatus is operating in the power saving mode, the turn-on loss can further be reduced by the arrangement described in the first or second embodiment. In the normal operation state in which the output voltage V0 is not low, it is possible to prevent excessive voltage application to each element of the RCC power supply apparatus and an operation error of the circuit.

As described above, according to this embodiment, in the power supply apparatus of the image forming apparatus, which lowers the output voltage under light-load conditions, it is possible to reduce the turn-on loss of the switch element under light-load conditions while preventing excessive voltage application to each element and an operation error of the circuit.

Other Embodiments

In the RCC power supply apparatus according to the first embodiment, the transformer 406 includes, as auxiliary windings, the two windings Nb1 and Nb2 having different numbers of turns. The CPU 418 determines turn-on/off of the transistor 101 via the photocoupler 103 and switches between the windings Nb1 and Nb2. However, the Zener diode 301, the capacitor 302, and the transistors 303 and 304 according to the second embodiment may be applied to the arrangement in which the transformer 406 includes the two windings Nb1 and Nb2, as auxiliary windings. That is, the transistors 303 and 304 may determine turn-on/off of the transistor 101 and switch between the windings Nb1 and Nb2. In this case, the Zener diode 301 is connected to the terminal of the winding Nb2 indicated by a full circle.

In the RCC power supply apparatus according to the second embodiment, the auxiliary winding Nb3 of the transformer 406 includes a center tap portion. The transistors 303 and 304 determine turn-on/off of the transistor 101 and switch between the terminal of the winding Nb3 and the center tap portion. However, the photocoupler 103 according to the first embodiment may be applied to the arrangement in which the auxiliary winding Nb3 of the transformer 406 includes the center tap portion. That is, the CPU 418 may determine turn-on/off of the transistor 101 via the photocoupler 103 and switches between the terminal of the winding Nb3 and the center tap portion.

In the first to third embodiments, the RCC power supply apparatus includes the CPU 418, and the CPU 418 outputs a high-level control signal under light-load conditions. However, when the RCC power supply apparatus of the first or second embodiment is mounted in, for example, an electronic device such as an image forming apparatus, as in the third embodiment, a CPU such as a control unit provided in the electronic device such as an image forming apparatus may output a high-level control signal to the RCC power supply apparatus under light-load conditions.

As described above, in the other embodiments as well, in the power supply apparatus that lowers the output voltage under light-load conditions, it is possible to reduce the turn-on loss of the switch element under light-load conditions while preventing excessive voltage application to each element and an operation error of the circuit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-130639, filed on Jun. 8, 2012, which is hereby incorporated by reference herein in its entirety.

What is claimed is:

1. A power supply apparatus comprising:
a transformer including a primary winding, a secondary winding, and a first feedback winding positioned on a side of the primary winding of the transformer, a second feedback winding positioned on a side of the primary winding of the transformer, the second feedback winding whose number of turns is larger than a number of turns of the first feedback winding;
a switch element configured to oscillate for generating a voltage in the primary winding, the switch element having a control terminal connected to the first feedback winding and the second feedback winding, wherein a first voltage generated in the first feedback winding or a second voltage generated in the second feedback winding is supplied to the control terminal, wherein the switch element is capable of oscillating at a first frequency for outputting a predetermined voltage from the secondary winding and at a second frequency lower than the first frequency for outputting a lower voltage lower than the predetermined voltage from the secondary winding; and
a switching circuit for switching a voltage supplied to the control terminal so that the first voltage is supplied to the control terminal of the switch element in a case where the voltage output from the secondary winding of the transformer is the predetermined voltage, and the second voltage is supplied to the control terminal of the switch element in a case where the voltage output from the secondary winding of the transformer is the lower voltage lower than the predetermined voltage.

2. The power supply apparatus according to claim 1, further comprising a detection unit that detects the voltage output from the secondary winding of the transformer, wherein the detection unit includes a photocoupler.

3. The power supply apparatus according to claim 1:
wherein the feedback winding includes a center tap configured to form the first feedback winding and the second feedback winding.

4. A power supply according to claim 1,
wherein the switching circuit has a switch for selectively supplying the the first voltage or the second voltage to the control terminal of the switch element.

5. The power supply according to claim 4, further comprising a photocoupler connected to the switch, in a case where the voltage output from the secondary winding of the transformer is the lower voltage lower than the predetermined voltage, the switch is turned on by the turn-on of the photocoupler.

6. The power supply according to claim 1,
wherein a state in which the lower voltage lower than the predetermined voltage is output from the secondary winding is a power saving state.

7. An image forming apparatus comprising:
a control unit that controls an operation of the image forming apparatus; and
a power supply that supplies power to the control unit, the power supply comprising:
a transformer including a primary winding, a secondary winding, and a first feedback winding positioned on a side of the primary winding of the transformer, and a second feedback winding positioned on a side of the primary winding of the transformer, the second feedback winding whose number of turns is larger than a number of turns of the first feedback winding;
a switch element configured to oscillate for generating a voltage in the primary winding, the switch element having a control terminal connected to the first feedback winding and the second feedback winding, wherein a first voltage generated in the first feedback winding or a second voltage generated in the second feedback winding is supplied to the control terminal, wherein the switch element is capable of oscillating at a first frequency for outputting a predetermined voltage from the secondary winding and at a second frequency lower than the first frequency for outputting a lower voltage lower than the predetermined voltage from the secondary winding; and
a switching circuit for switching a voltage supplied to the control terminal so that the first voltage is supplied to the control terminal of the switch element in a case where the voltage output from the secondary winding of the transformer is the predetermined voltage, and the second voltage is supplied to the control terminal of the switch element in a case where the voltage output from the secondary winding of the transformer is the lower voltage lower than the predetermined voltage.

8. The image forming apparatus according to claim 7, further comprising a detection unit that detects the voltage output from the secondary winding of the transformer, wherein the detection unit includes a photocoupler.

9. The image forming apparatus according to claim 7:
wherein the feedback winding includes a center tap configured to form the first feedback winding and the second feedback winding.

10. The image forming apparatus according to claim 7, wherein the switching circuit has a switch for selectively supplying the the first voltage or the second voltage to the control terminal of the switch element.

11. The image forming apparatus according to claim 10, further comprising a photocoupler connected to the switch, in a case where the voltage output from the secondary winding of the transformer is the lower voltage lower than the predetermined voltage, the switch is turned on by the turn-on of the photocoupler.

12. The image forming apparatus according to claim 7, wherein a state in which the lower voltage lower than the predetermined voltage is output from the secondary winding is a power saving state.

* * * * *